United States Patent
Whittaker et al.

(10) Patent No.: US 9,338,077 B1
(45) Date of Patent: May 10, 2016

(54) ADDRESS RESOLUTION IN UNNUMBERED PSEUDO-POINT-TO-POINT NETWORK

(75) Inventors: Colin J. Whittaker, Dublin (IE);
Frederick David Sinn, Seattle, WA (US); Justin O. Pietsch, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 13/231,783

(22) Filed: Sep. 13, 2011

(51) Int. Cl.
*H04L 12/24* (2006.01)
*H04L 12/751* (2013.01)

(52) U.S. Cl.
CPC ............... *H04L 45/02* (2013.01); *H04L 41/12* (2013.01)

(58) Field of Classification Search
USPC .................................. 370/254, 401; 398/140
See application file for complete search history.

(56) References Cited

U.S. PATENT DOCUMENTS

| | | | |
|---|---|---|---|
| 7,006,528 B1 * | 2/2006 | Kokkinen ..................... | 370/467 |
| 7,631,100 B2 | 12/2009 | Ben-Zvi et al. | |
| 7,710,936 B2 | 5/2010 | Morales Barroso | |
| 7,715,394 B2 | 5/2010 | Six | |
| 7,778,201 B2 * | 8/2010 | Daines et al. ................. | 370/254 |
| 7,856,024 B1 * | 12/2010 | Karuppiah et al. ........... | 370/401 |
| 8,094,567 B2 * | 1/2012 | Li et al. ....................... | 370/241.1 |
| 2002/0089958 A1 | 7/2002 | Feder et al. | |
| 2003/0112764 A1 * | 6/2003 | Gaspard et al. ............... | 370/252 |
| 2004/0202199 A1 * | 10/2004 | Fischer et al. ................ | 370/474 |
| 2007/0086455 A1 * | 4/2007 | Allan et al. ................... | 370/389 |
| 2008/0181241 A1 * | 7/2008 | Regan et al. .................. | 370/401 |
| 2009/0232152 A1 * | 9/2009 | Chen ............................ | 370/419 |
| 2010/0014458 A1 * | 1/2010 | Singh et al. .................. | 370/328 |
| 2011/0019689 A1 * | 1/2011 | Diab et al. ................... | 370/462 |
| 2011/0051733 A1 * | 3/2011 | Hirata ........................... | 370/400 |
| 2011/0243116 A1 * | 10/2011 | Endo ................. A61B 1/00016 370/338 |  |
| 2012/0230192 A1 * | 9/2012 | Jain et al. ..................... | 370/235 |

OTHER PUBLICATIONS

D. Plummer, "An Ethernet Address Resolution Protocol," RFC 826, Nov. 1982.*
H. Yoon et al, iDLS: Inter-BSS Direct Link Setup in IEEE 802.11 WLANs, ISCIT, 2007.*
Certcollection, Unnumbered Ethernet VLAN interfaces—IT Certification Forum, Sep. 2010.
Cisco Systems, VLANS over IP Unnumbered Subinterfaces, Mar. 2006.
Mamakos et al., RFC 2516: A Method for Transmitting PPP Over Ethernet (PPPoE), Feb. 1999.

* cited by examiner

*Primary Examiner* — Michael Thier
*Assistant Examiner* — Yaotang Wang
(74) *Attorney, Agent, or Firm* — Knobbe, Martens, Olson & Bear, LLP

(57) ABSTRACT

Address resolution in an unnumbered, pseudo-point-to-point network utilizes address transmissions, such as an address advertisement or an address response, in order to obtain address information for use in frame addressing. In one embodiment, routers communicate using a multi-access data link layer protocol, such as Ethernet, but in a physical configuration which restricts data link layer communications to going between only two nodes, thereby negating the multi-access application of the protocol. With only one possible terminal node, address space is conserved by use of unnumbered network interfaces.

15 Claims, 8 Drawing Sheets

ADDRESS RESOLUTION IN UNNUMBERED PSEUDO-POINT-TO-POINT NETWORK

BACKGROUND

Network data is often transmitted as frames between computer network devices. Such frames may be sent from a network interface of one network device, to a network interface of another network device. In order to comply with a particular networking protocol, a network device may include certain data in a frame. Such data may include the hardware address of the interface which will send the frame as the source hardware address, and the hardware address of the interface which is intended to receive the frame as the target hardware address. This frame structure may be used because a network protocol used between the devices supports one or more network topologies which are not a point-to-point topology. Such a network protocol may allow a transmitted frame to be received at the data link layer by multiple other network devices. The inclusion of a target hardware address may enable a network device which receives the frame to determine whether it is the intended recipient.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein.

DETAILED DESCRIPTION OF SPECIFIC EMBODIMENTS

Introduction

Known networking protocols for non-point-to-point networks rely on network layer communications for one network device to obtain another's hardware address. A popular example is the Address Resolution Protocol (ARP). As such, a network device may be limited in that it may only discover the hardware address of another network device if both devices are on the same logical network layer subnet. To enable routing between network layer subnets, network devices such as routers often have multiple network interfaces on a variety of network layer subnets, each interface associated with a network address on a particular subnet. However, having multiple network interfaces with different network addresses results in each network device consuming many network addresses, of which there are a limited number within any network. For a large network, it may be advantageous for each network device to have fewer network addresses associated with it. Such a reduction in network address allocations may also improve performance by reducing the size and complexity of routing tables used within the network.

However, in a network comprising multiple subnets, reducing the number of network addresses used may result in network devices which are directly connected to each other, but lacking network addresses in a common subnet. Such devices may be unable to discover each other's hardware addresses, and thus unable to properly address frames to each other. This disclosure therefore describes, among other features, embodiments for enabling directly-connected network devices to discover each other's hardware addresses even when the devices do not share a common subnet.

Unnumbered Pseudo-Point-To-Point Network

Figure 1:
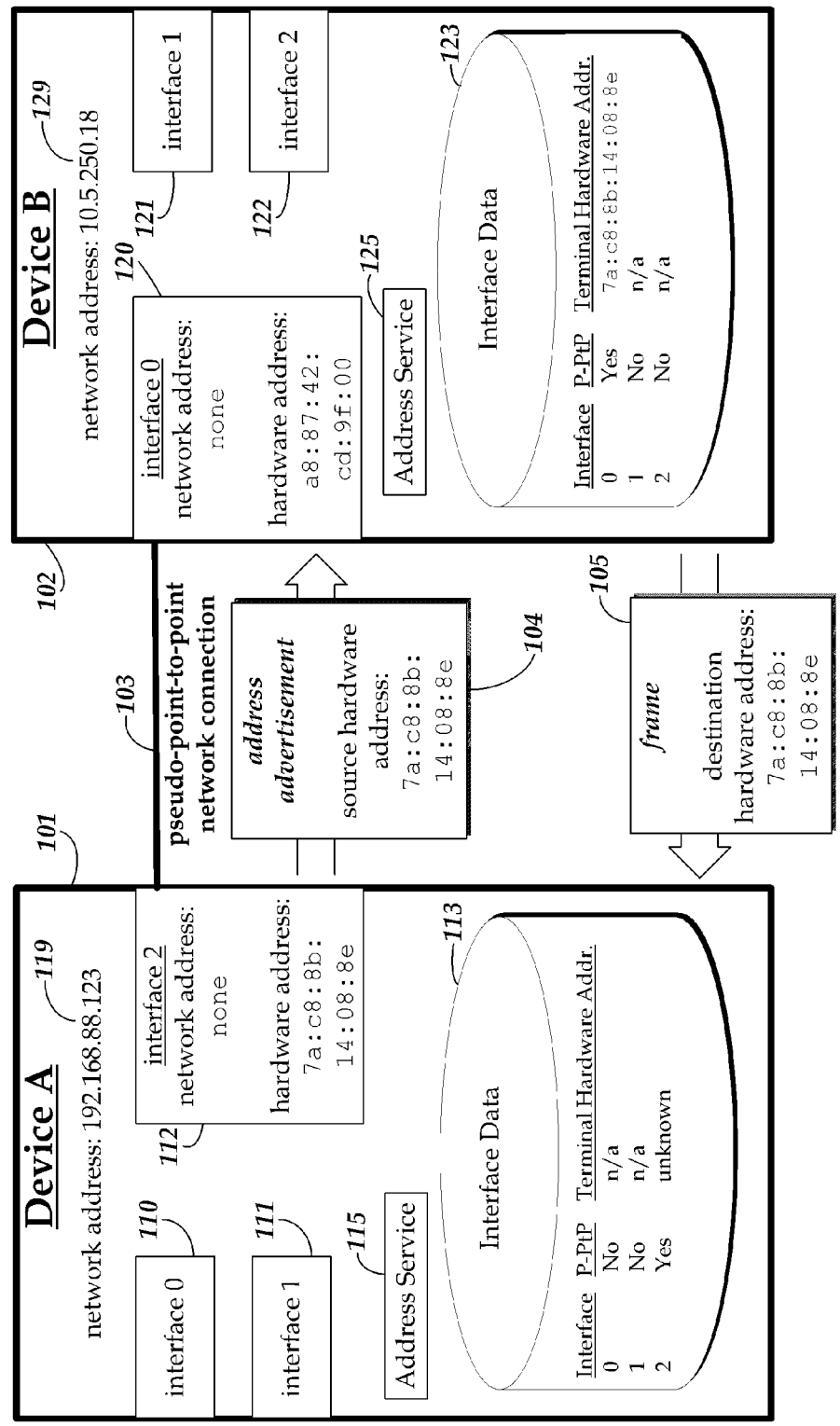
FIG. 1 depicts one embodiment of a system in which two network devices communicate with each other, using unnumbered network interfaces, in a pseudo-point-to-point manner.

Referring to FIG. 1, an example network is shown in which two devices, Device A 101 and Device B 102 (collectively, "the connected interfaces"), communicate in an unnumbered, pseudo-point-to-point manner. This conserves network address usage within the illustrated network. The connected devices communicate with each other using a direct connection 103 having, in some embodiments, exactly two nodes at the data link layer. This characteristic allows the connected interfaces 112, 120 to reduce the use of network addresses by leaving their respective interfaces 2 and 0 unnumbered at the network layer. Device A's interface 2, 112, transmits an address advertisement 104 across the network connection 103, so that Device B will know the hardware address of the other terminal node in communication with Device B's interface 0, 120, via the network connection 103—namely Device A's interface 2. Device B subsequently transmits a frame 105 from its interface 0, 120, across the network connection 103. The frame 105 includes as its destination hardware address the address obtained from the address advertisement 104.

Considering the elements of FIG. 1 in greater detail, Device A 101 and Device B may each be any of a variety of computer devices capable of network communication, such as routers, servers, computers, and mobile devices. Device A 101 includes multiple network interfaces: interface 0, 110, interface 1, 111 and interface 2 112. Device B also includes multiple interfaces: interface 0, 120, interface 1, 121 and interface 2 122. Examples of such interfaces include an Ethernet network adapter, a coaxial network adapter, a fiber optic network adapter, and a wireless network adapter. In one embodiment, different types of adapters are used within the same network device.

The connected interfaces 112, 120, are both unnumbered, meaning neither one has a network layer address uniquely associated with that interface in the context of its respective network device. In another embodiment, one of the connected interfaces is unnumbered while the other is unnumbered. In the illustrated embodiment, these interfaces are listed as having no network address associated with them. In another embodiment, an unnumbered network interface within a device may be associated with a shared network address. A shared network address may be associated with another network interface within the device housing the interface, and/or with the device housing the interface. For example, Device A has a network address of 192.168.88.123 which is associated with the device broadly 119, rather than with a single interface of the device. If the same network address was associated with Device A's interface 2, 112, that interface may still be considered unnumbered. Similarly, Device B has a network address of 10.5.250.18 associated with it, 129. In the present embodiment, the devices' network addresses are within different subnets.

Each of the connected interfaces 112, 120 has a hardware address. Device A's interface 2 has a hardware address of 7a:c8:8 b:14:08:8e. Device B's interface 0 has a hardware address of a8:87:42:cd:9f:00. In the present embodiment, each hardware address is a Media Access Control (MAC) address. In other embodiments, one or more other hardware address standards may be used.

Device A's interface 2, 112, is physically connected to device B's interface 0, 120, via a direct network connection 103, such that at the physical layer of the protocol stack used between the two connected interfaces, in certain embodiments, each interface may only communicate with the other one. However, in certain embodiments, the direct network connection 103 between the devices is non-point-to-point in that the interfaces 112, 120 do not utilize a point-to-point protocol at the data link layer of the protocol stack. For example, the network layer, utilized by Device B 102 when communicating with Device A 101, may rest logically directly above a data link layer's Logical Link Control (LLC) sub-layer which supports multiple-access (by multiple devices), such as Ethernet framing. That is, the direct network connection 103 may be considered non-point-to-point in that its network layer does not depend on a single-access data link layer.

While Device A's interface 2, 112 and Device B's interface 0, 120 do not communicate in a point-to-point manner, in certain embodiments they do communicate in a pseudo-point-to-point manner. That is, they communicate using one or more data link layer protocols which are capable of supporting multi-access data link connections, but are used in a single-link fashion given the known, direct nature of the network connection 103 between the interfaces. Accordingly, in certain embodiments, the network connection 103 is pseudo-point-to-point in that it operates as if it was a point-to-point connection, without employing a point-to-point protocol.

To facilitate such pseudo-point-to-point communication, Device A includes an address service 115. Device B also includes an address service 125. In certain embodiments, one or more of the address services 115, 125 may be responsible for transmitting an address transmission using a network interface. For example, in FIG. 1, Device A transmits an address advertisement 104 over the network connection 103. An address advertisement is one type of address transmission, with other embodiments additionally or alternatively using one or more other types of address transmissions (see, e.g., FIG. 2). The address advertisement 104 may have been constructed by, or constructed in response to the behavior of, Device A's address service 115. The address advertisement 104 may then be transmitted from the network interface for which it was constructed—in the case of FIG. 1, Device A's interface 2, 112. For example, an address service 115 may be computer executable software written in the form of one or more of any of a variety of programming languages, such as C, C++, an assembly language, or a scripting language. The address transmission 104 includes address information. In the depicted embodiment, the address transmission 104 includes a source hardware address field which identifies the hardware address of the network interface which sent the address advertisement: Device A's interface 2, 112.

In various embodiments, network devices such as Device A 101 may transmit one or more address transmissions 104 based on one or more of a multitude of possible criteria. For example, the address service 115 may detect a new connection, such as a physical layer connection, established on an interface and may cause an address transmission 104 to be transmitted from that network interface in response to that detection. For example, such detection may occur based on the detection of electrical signals used to establish a physical layer handshake. Additionally or alternatively, a network device may transmit an address transmission in response to an administrator action, at a recurring time interval, based on a detected change in network configurations or properties, and/or randomly. In certain embodiments, a network device may contain, or be in communication with, interface data 113 which indicates whether a particular interface is configured in pseudo-point-to-point mode (P-PtP in FIG. 1's Interface Data illustration 113). In some such configurations, the network device may only transmit one or more address transmissions 104 over a network interface if that network interface is configured in pseudo-point-to-point mode. For example, the address service 115 may check data stored in the interface data 113 to determine whether a particular network interface is configured in pseudo-point-to-point mode, or may query the interface data 113 for network interfaces configured in pseudo-point-to-point mode.

The address transmission 104 sent by Device A 102 from its interface 2, 112, over the network connection 103, is received by Device B 102 at its interface 0, 120. In this example, an address service 125 on Device B 102 receives the address transmission 104 first received at interface 0, 120. The address service 125 identifies address information contained within the address transmission 104. In the certain embodiments, the address service 125 identifies the source hardware address contained within the address transmission 104 in order to determine the hardware address of the terminal node with which Device B 102 is connected to using Device B's interface 0, 120.

Here, the terminal node is Device A's interface 2, 112, which has a hardware address of 7a:c8:8b:14:08:8e—which value was transmitted as the source hardware address of the address advertisement 104. The address service 125 can cause this terminal hardware address to be stored in an interface data store 123, in a manner indicating that the hardware address is related to Device B's interface 0, 120. The interface data 123 of Device B may also indicate that Device B's interface 0, 120 is configured in pseudo-point-to-point mode. In one embodiment, the address service 125 listens for address advertisements on an interface if that interface is already configured in pseudo-point-to-point mode. In another embodiment, the receipt of an address transmission on a network interface may cause the interface to be configured in pseudo-point-to-point mode, for example, by action of the address service modifying the interface data associated with that interface.

In the illustrated embodiment, once Device B 102 has received the hardware address of Device A's interface 2, 112, Device B is capable of addressing a frame 105 to Device A 101. Device B may construct a frame, for example in a buffer memory space, and subsequently transmit the frame 105 using Device B's interface 0, 120, over the network connection 103, so that the frame 105 will reach Device A's interface 2, 112. As shown, the frame 105 includes the hardware address of Device A's interface 2, 112 as the destination hardware address of the frame 105. The frame may also include the hardware address of the sending interface as its source hardware address—for example, the hardware address of Device B's interface 0, 120 in the illustrated scenario.

The depicted embodiment includes interfaces, such as Device A's interfaces 0 and 1 which are not configured in pseudo-point-to-point mode. In one embodiment, a network device does not store a terminal hardware address associated with an interface which is not operating in pseudo-point-to-point mode. For example, Device A has listed as "not applicable" the terminal hardware address for its interfaces 0 and 1. In one embodiment, those interfaces may be multi-access data link layer interfaces, such as standard Ethernet interfaces which are each capable of addressing a plurality of other devices at the data link layer. Accordingly, there may not be a single terminal interface associated with the connection on these interfaces, and there may be no need to record a terminal hardware address.

Furthermore, as shown by the interface data of Device A, Device A does not yet know the terminal hardware address associated with the connection of Device A's interface 2. Namely, Device A has not yet learned the hardware address of Device B's interface 0, 120. In one embodiment, Device B may subsequently transmit an address transmission much like Device A had transmitted an address transmission 104. Alternatively or additionally, Device A may learn of the hardware address of Device B's interface 0, 120, by another transmission, such as the frame 105 transmitted by Device B's interface 0, 120. For example, the frame may include as its source hardware address the hardware address of Device B's interface 0, 120.

Address Resolution

One or more of a variety of different address transmissions may be used to accomplish address resolution. Referring to FIG. 1, an address advertisement was illustrated, in which while each figure depicts one embodiment, the description for any given figure usually describes several. In that embodiment, an address advertisement was sent by Device A 101 not in response to any action by Device B 102. The address advertisement may be a frame which includes the sender's hardware address as the source hardware address, and a special hardware address as the target hardware address, in order to indicate that the frame is an advertisement. In another embodiment, a protocol is utilized for the address advertisement which does not include a target hardware address. Other types of address advertisements, and address transmissions other than address advertisements, are contemplated.

Figure 2:
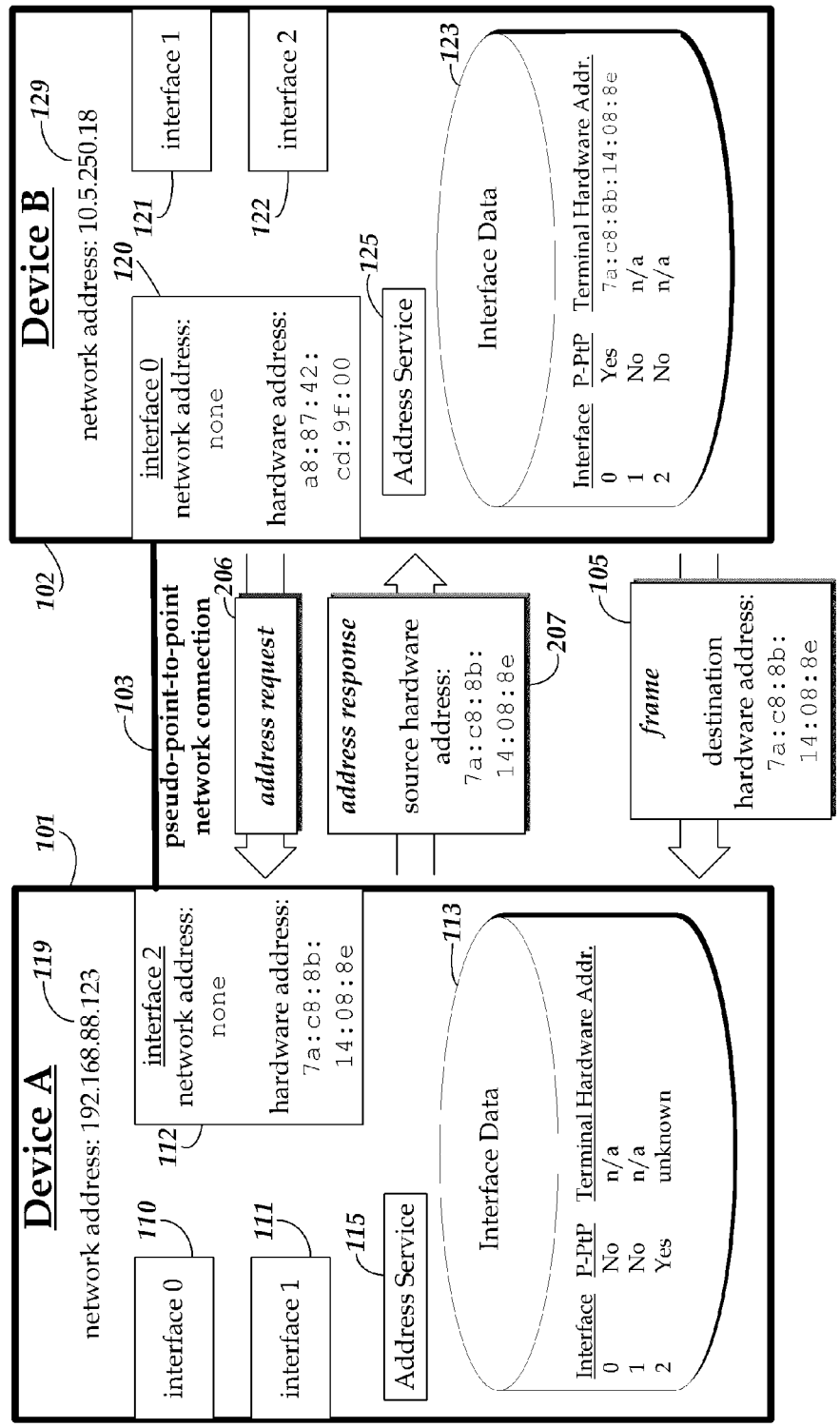
FIG. 2 depicts another embodiment of a system in which two network devices communicate with each other, using unnumbered network interfaces, in a pseudo-point-to-point manner. This embodiment utilizes an address request and address response for the exchange of address information.

Referring to FIG. 2, an address response 207 is shown as another example of an address transmission. Here, Device B transmits an address request 206, using Device B's interface 0, 120, over the network connection 103. In one example, the address request 206 may be a frame with the hardware address of the transmitting interface as the source hardware address, and a special hardware address value as the destination hardware address. In other embodiments, the address request does not include a source hardware address and/or a destination hardware address.

In response to the address request 206, the terminal hardware device, Device A 101, transmits an address response 207. In this example, the address response 207 includes the hardware address of Device A's interface 2, 112, as its source hardware address. In some embodiments, the address response may include as its destination hardware address the source hardware address of the received address request 206—that is, the hardware address of Device B's interface 0, 120.

In the illustrated embodiment, Device B's address service 125 is at least partly responsible for the transmission of the address request 206, and Device A's address service 115 is at least partly responsible for the transmission of the address response 207. Device B may store Device A's interface 2, 112 hardware address as the terminal hardware address associated with Device B's interface 0, 120. For example, Device B's address service 125 may send the address request 206 in response to receipt of data from another service in Device B which has requested that data be transmitted to Device A, and/or over interface 0. Device B's address service 125 may attempt to locate the terminal hardware address for interface 0, and, upon detecting that the terminal hardware address is unknown, may cause the address request 206 to be transmitted. Once an address response 207 is received, the address service 125 may permit the data to be included as the payload to a frame 105 which includes the learned terminal hardware address as its destination hardware address. In other embodiments, other events may trigger the transmission of the address request.

Network Address Information

Figure 3:
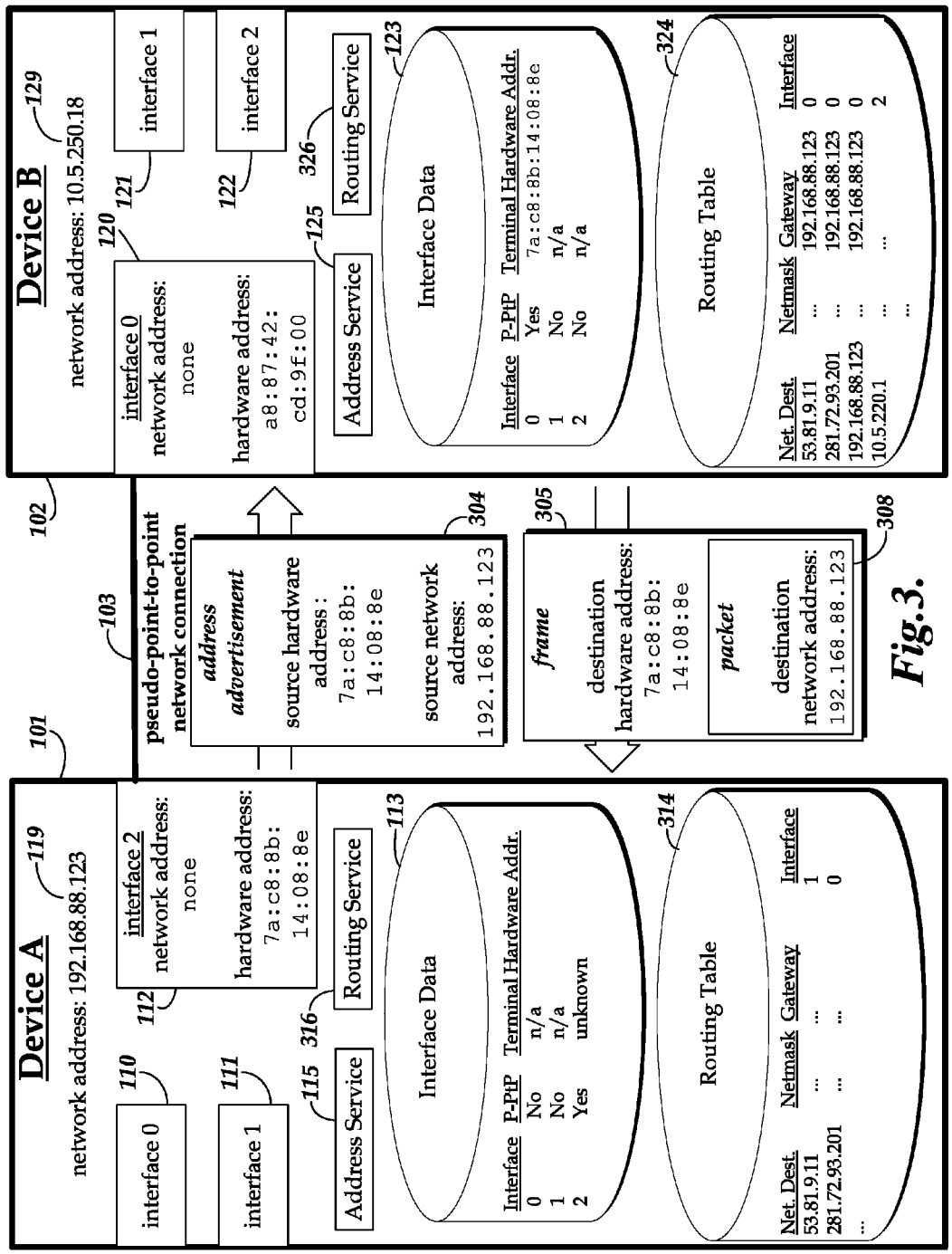
FIG. 3 depicts yet another embodiment of a system in which two network devices communicate with each other, using unnumbered network interfaces, in a pseudo-point-to-point manner. Here, the address advertisement also includes network layer address information, and a resulting frame includes a packet comprising the network layer address information.

In some embodiments, address information transmitted within address transmissions includes information for one or more addresses which are not hardware addresses. Referring to FIG. 3, an embodiment is shown in which an address advertisement 304 includes both a source hardware address and a source network address. The network interface which transmitted the address advertisement 304 was unnumbered, so there was no network address unique to that interface, 112. However, in the depicted embodiment the network address of the device which includes the interface is non-uniquely associated with that interface. Accordingly, the address advertisement 304 includes the network address 119 of Device A 101 as its source network address: 192.168.88.123.

Device A 101 may be a router and include a routing table data store 314. Device B 102 is also a router with a routing table data store 324. Device B's routing table 324 includes data indicating that for a particular network destination and netmask, what gateway and interface of Device B should be used for communication. Device B further includes a routing service 326, which may store, update, and/or maintain data in the routing table 324, and may access data within the routing table in order to determine a route for a data packet transmission. In another embodiment, cost data, such as a metric measurement, may also be stored in the routing table 324 and accessed by the routing service 326 when the routing service is selecting amongst a plurality of possible routes for the packet to be transmitted.

In some embodiments, information stored within the routing table is affected by information received from address transmissions. For example, upon receipt of the illustrated address advertisement 304, at Device B's interface 0, Device B's routing service may add an entry to its routing table 324 corresponding to a route to the network address of Device A: 192.168.88.123, which may be accessed over Device B's interface 0, 120, using a gateway network address of 192.168.88.123. The routing service 326 of Device B may also obtain information concerning additional network destinations which may be reached through Device A acting as a gateway.

For example, in the present embodiment, Device B 102 has information within its routing table 324 which indicates that network destinations for devices not shown here, with network addresses of 53.81.9.11 and 281.72.93.201, may be routed to using Device A as a gateway, and by using Device B's interface 0 as the outgoing interface. In one embodiment, this routing information may be exchanged by communication between the routing service of Device A 316 and the routing service of Device B. For example, Device A may communicate information gathered from its routing table 314, such as possible network destinations and their routing costs from Device A. Device B may then associate Device A as the gateway to those network destinations and may record their routing costs as some fixed amount above the costs reported by Device A.

As shown in the present embodiment, a network device such as Device B may transmit a frame 305 which includes a network packet 308 as its payload. The packet 308 may be targeted with a destination network address of a device which can be routed through the other connected interface, or the destination network address may be for the device hosting the other connected interface, as shown in FIG. 3.

Address Advertisement Frame Structure

Figure 4:
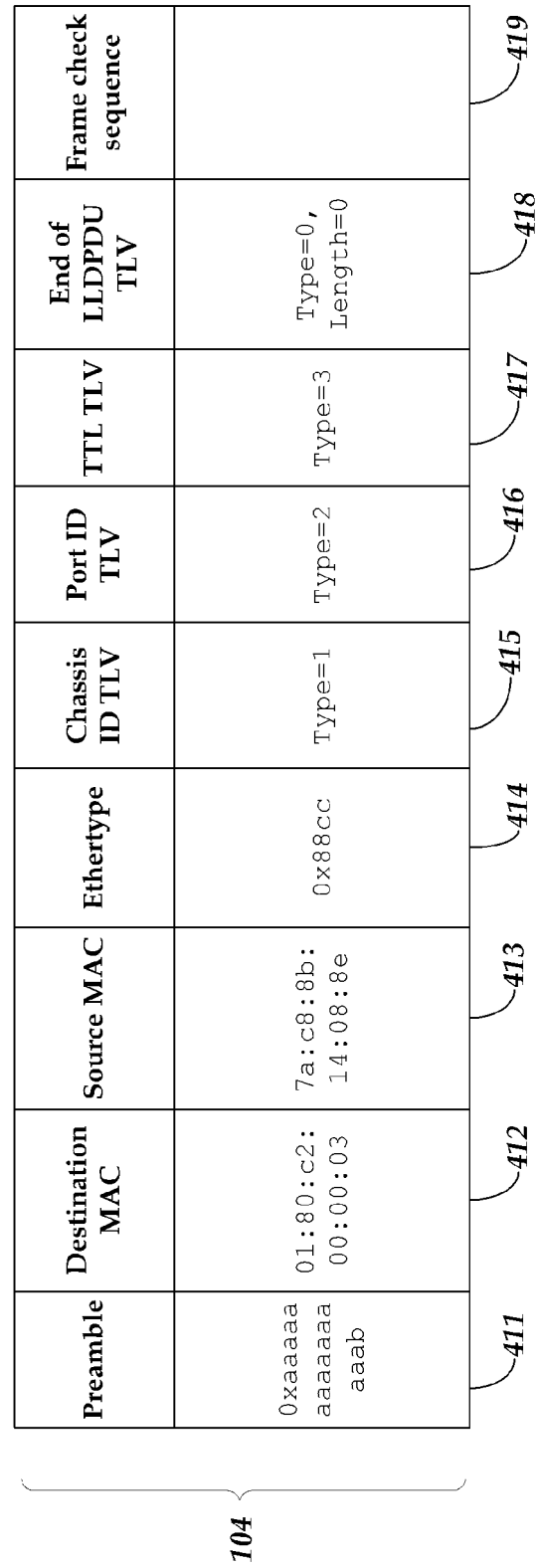
FIG. 4 illustrates one example of an address advertisement which may be used in a pseudo-point-to-point network.

Referring to FIG. 4, an example address advertisement 104 is shown. The present embodiment includes a frame with a specific bit structure conforming to the Link Layer Discovery Protocol (LLDP). In this embodiment, the LLDP is used for address advertisement, but in other embodiments, one or more other protocols may be used. For example, in other embodiments one or more of Cisco Discovery Protocol, Extreme Discovery Protocol, Nortel Discovery Protocol (SONMP), Microsoft's Link Layer Topology Discovery (LLTD), and/or LLDP may be used.

The frame begins with a preamble 411, followed by a destination MAC address 412. In the present embodiment, this MAC address is one of the reserved values within the LLDP which indicate that the frame is an advertisement. The next bits 413 correspond to the source MAC address, which is the hardware address of the network interface transmitting the address advertisement. This value may be stored by the recipient for use in addressing later frames to the device which transmitted this address advertisement 104. These bits are followed by the EtherType octets 414, and a series of type-length-value 415-418 structures according to the LLDP protocol. The frame concludes with a frame check sequence 419.

Network Architecture

Figure 5:
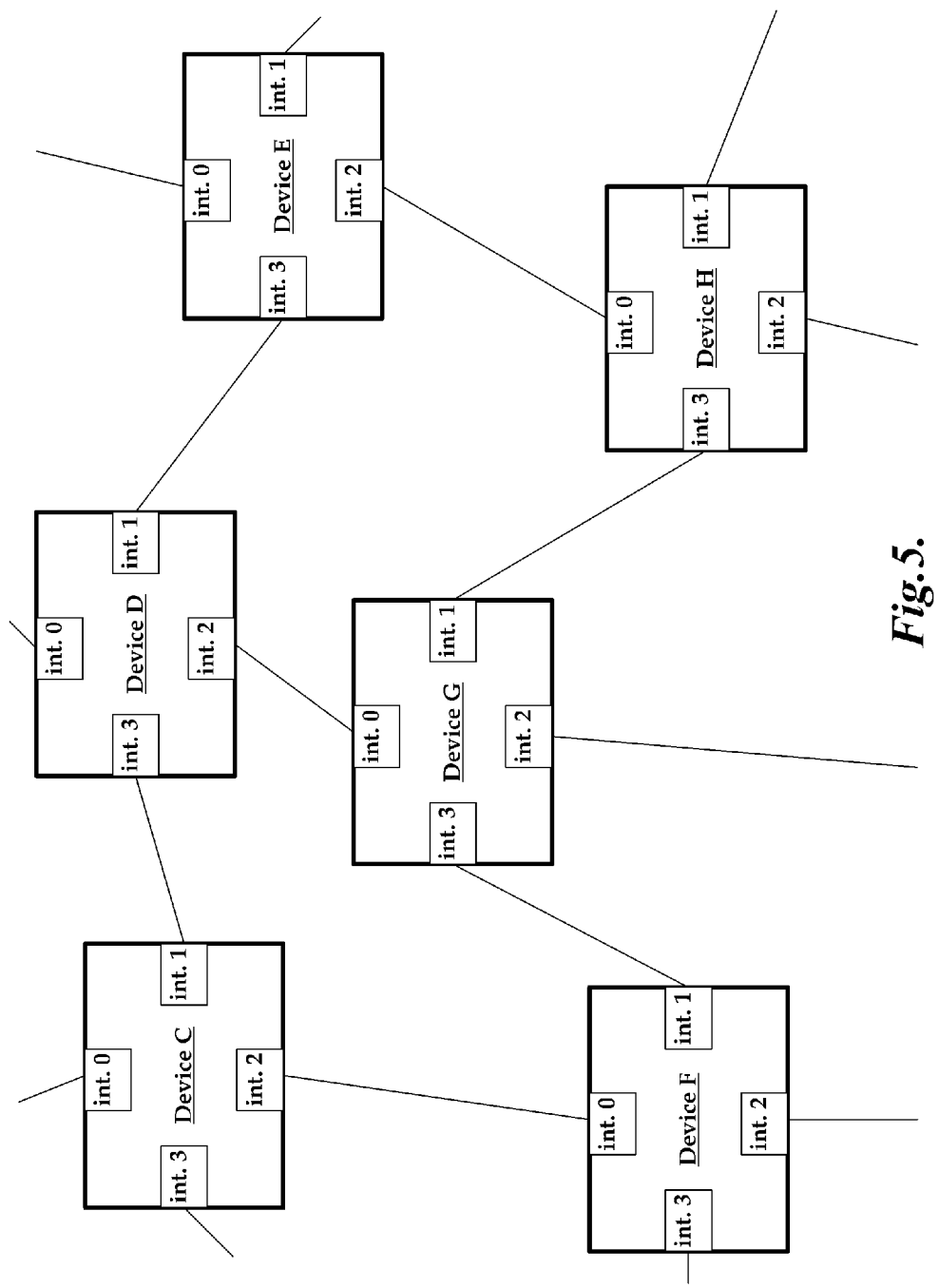
FIG. 5 shows an example network of devices communicating in a pseudo-point-to-point manner.

Referring to FIG. 5, one embodiment of a network architecture is shown in which multiple routers communicate with each other over direct, pseudo-point-to-point, unnumbered connections. Each of the illustrated routers, Devices C, D, E, F, G and H, includes four network interfaces, interfaces 0, 1, 2, and 3. Many of the interfaces are operating in direct data link layer connections with an interface of another device. These interfaces may lack network addresses, but the routers are able to address frames between each other using the pseudo-point-to-point manner already described.

Network Device Behavior

Figure 6:
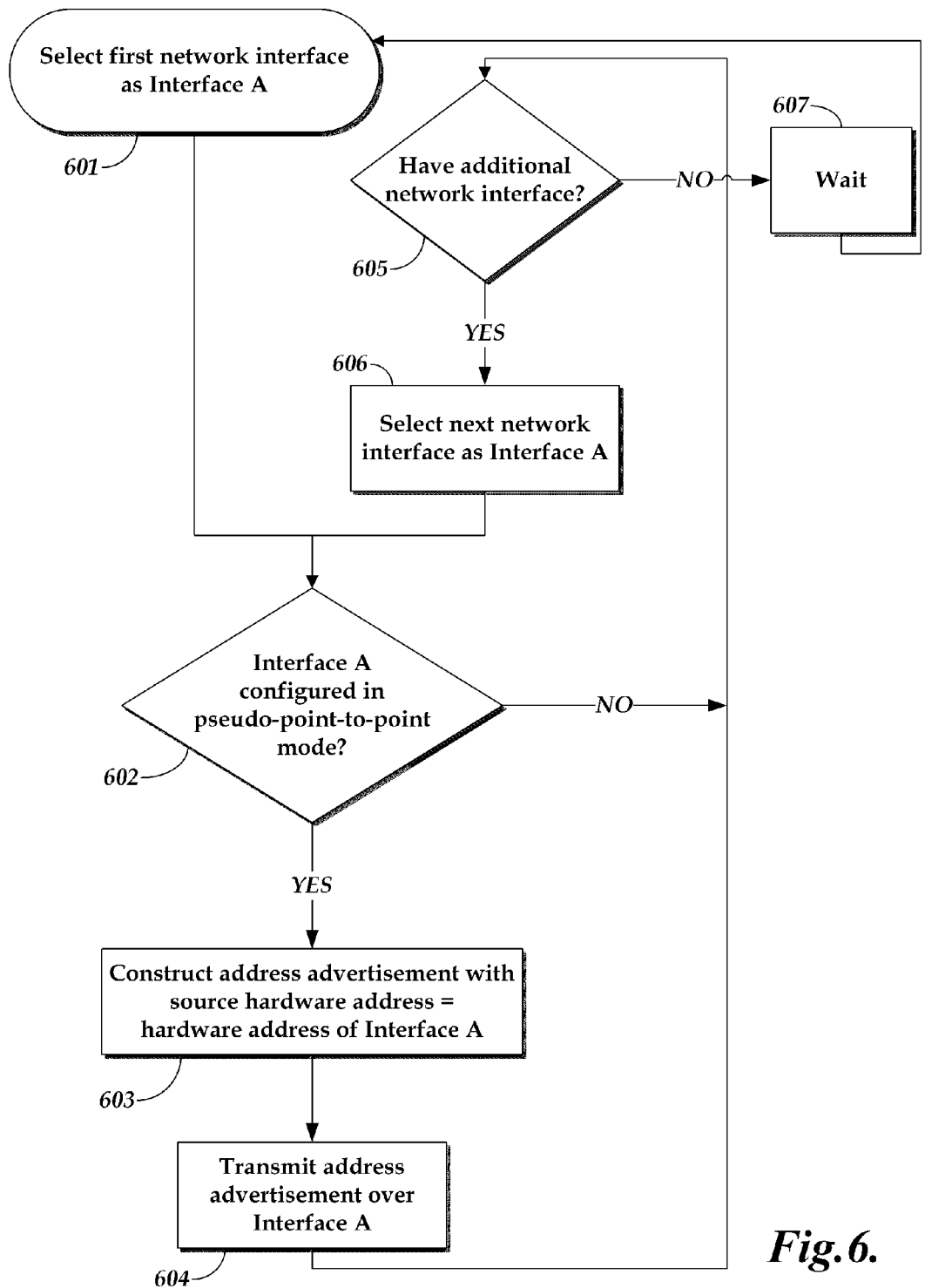
FIG. 6 depicts a flow process for transmitting address advertisement over one or more network interfaces at a recurring interval.

Referring to FIG. 6, there is shown one embodiment of a process with which a network device may make the hardware addresses of one or more of its network interfaces known in order to support pseudo-point-to-point communication. The process may be implemented by the address service 115 125. A first network interface is selected and designated as Interface A 601. It is determined whether Interface A is configured in a pseudo-point-to-point mode 602. Such a determination may be made, for example, based upon interface data 113. If the interface is not configured in pseudo-point-to-point mode, it is next determined whether the device has an additional network interface 605. If so, the next interface is selected as Interface A 606, and the process of checking for pseudo-point-to-point configuration is repeated. If there is no additional network interface, a wait is obeyed 607, before the process repeats from the start. For example, one embodiment may wait five minutes before repeating the process. In that embodiment, the five minutes wait may allow for reduced network noise, while also ensuring that newly added or reconfigured interfaces have their hardware addresses properly advertised within an acceptable timeframe. The cyclic nature of certain embodiments also provides for repeated advertisement of interfaces which have already advertised their network hardware addresses. This may allow the device in direct communication with such an interface to verify its stored terminal hardware address value.

If an interface designated as Interface A is found to be configured in a pseudo-point-to-point mode, an address advertisement is constructed 603. The address advertisement includes the hardware address of Interface A as its source hardware address 603. Once constructed, the address advertisement is transmitted over Interface A 604. It is then determined whether the device includes another network interface.

Figure 7:
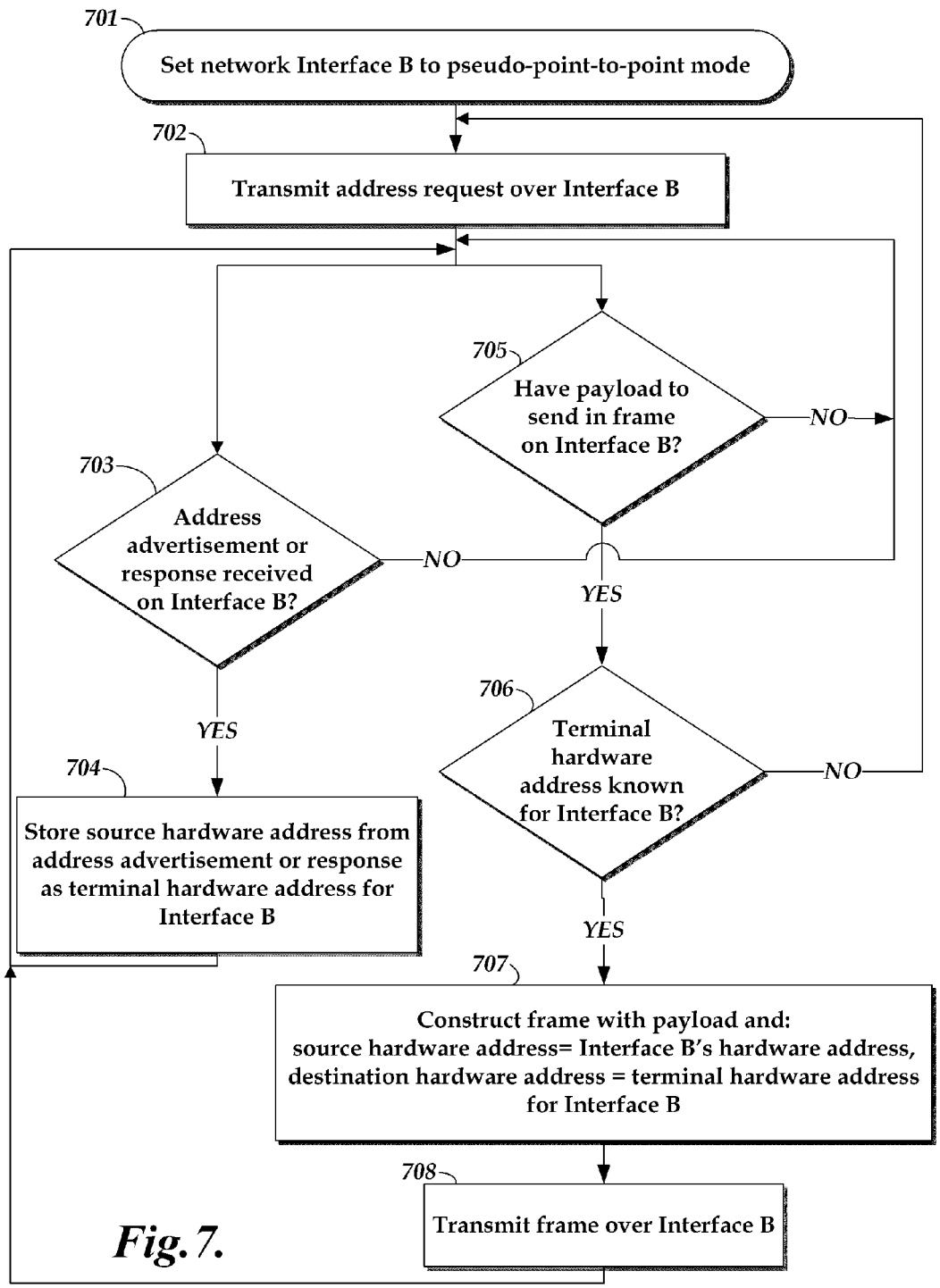
FIG. 7 shows a flow process for transmitting an addressed frame across a network interface operating in pseudo-point-to-point mode by first obtaining an address advertisement or response.

Referring to FIG. 7, an embodiment is shown for obtaining the hardware address of an interface to which a network device is directly connected in a pseudo-point-to-point manner. The process may be implemented by the address service 115, 125. An interface of the network device, referred to as Interface B, is set to pseudo-point-to-point mode 701. For example, an administrator may execute a command at a console which configures the interface. Alternatively or additionally, a web-browser based configuration system, or some other configuration system, may be used to configure the interface.

Once Interface B has been set to pseudo-point-to-point mode, an address request is transmitted over Interface B. In the present embodiment, the address request may include a hardware address of Interface B as its source hardware address. The process next waits for an address advertisement, or address response, to be received on Interface B. If such an address advertisement or address response is received, the source hardware address of that address transmission is stored as the terminal hardware address for Interface B, and the process returns to the waiting point.

At the same point of waiting, the process waits for a payload which is to be sent in a frame on Interface B 705. If such a payload is received, for example from some bus and/or process operating on the device, then it is determined whether the terminal hardware address is known for Interface B 706. If the terminal hardware address is known, then the device may properly address a frame to the terminal device with which it communicates over Interface B. Accordingly, one or more frames can be constructed which contain the payload data to be sent on Interface B. In the present embodiment, a single frame is constructed, but in other embodiments, the payload may be fragmented into multiple frames.

A frame is constructed which includes as its source hardware address the hardware address of Interface B, and includes as its destination hardware address the terminal hardware address for Interface B 707. The "terminal hardware address for Interface B" can be a hardware address for an interface other than Interface B—namely, the interface which is on the opposite terminal end of the connection to which Interface B is connected. The frame is then transmitted over Interface B, and the process resumes waiting for an updated address transmission and/or another payload to frame and transmit.

Network Protocol Stack

Figure 8:
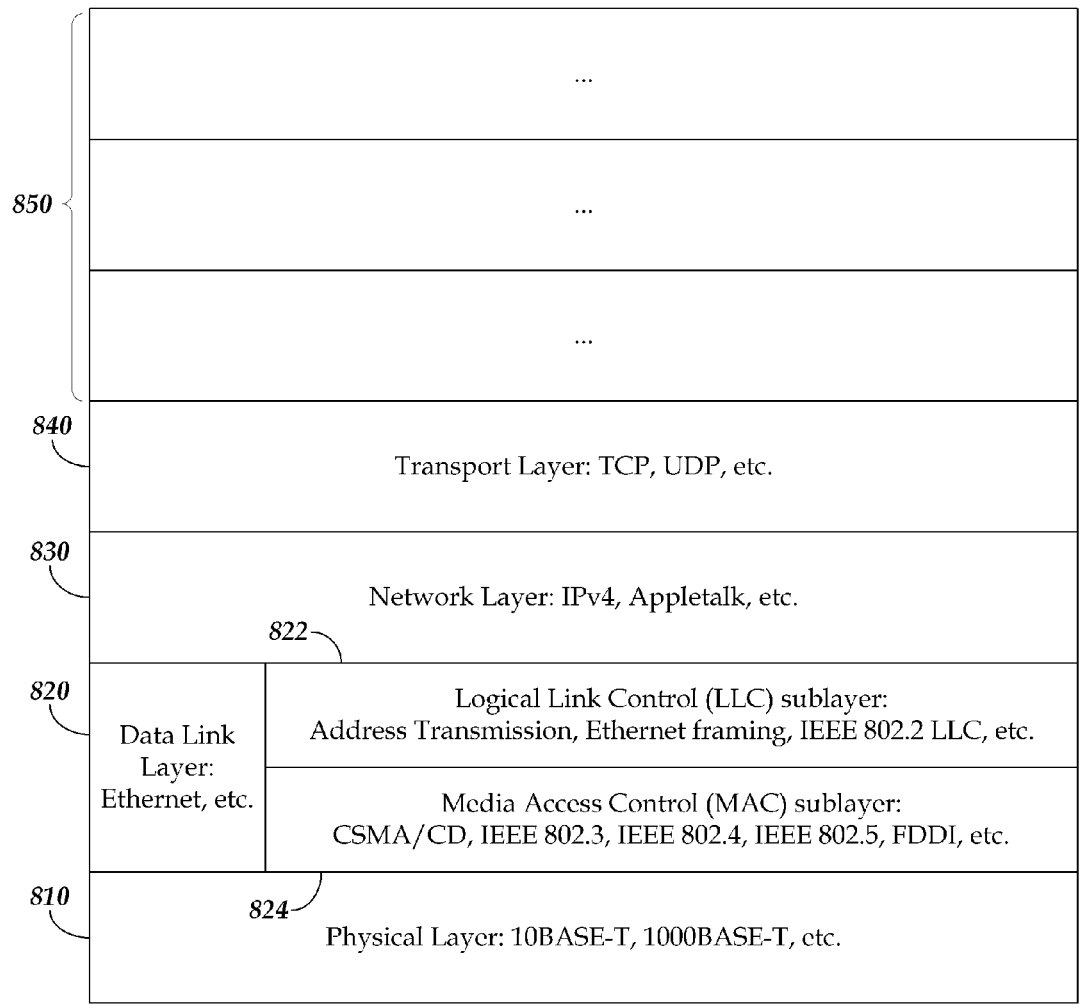
FIG. 8 illustrates an example network protocol stack with protocols which may be used for unnumbered, pseudo-point-to-point communication in certain embodiments.

Referring to FIG. 8, an illustrative embodiment of a network protocol stack for use with any of the systems and processes described herein or as shown. The network stack includes a physical layer 810 which may adhere to one or more standards such as 10BASE-T, 1000BASE-T, 802.11, or some other physical layer standard. For example, in some embodiments the physical layer may use wired communication while in other embodiments the physical layer may user wireless communication.

Logically above the physical layer sits the data link layer, which can be logically subdivided into a Media Access Control (MAC) sublayer 824, and a Logical Link Control (LLC) sublayer 822 resting above the MAC sublayer. In this embodiment, the MAC sublayer may use a protocol such as CSMA/CD, IEEE 802.3, IEEE 802.4, IEEE 802.5, FDDI, or some other MAC protocol. The LLC sublayer may include an Address Transmission protocol responsible for the construction and/or transmission of address transmission frames, such as address advertisements, address requests, and/or address responses. The LLC sublayer may alternatively or additionally implement other protocols such as Ethernet framing, and/or IEEE 802.2 LLC. Depending on the implemented protocols, the broader data link layer 820 may be considered to implement the Ethernet family of protocols.

Located logically above the data link layer 820 is the network layer 830. As illustrated, the present embodiment may use one or more network layer protocols, such as Internet Protocol v. 4 (IPv4), and/or Appletalk, etc. Additional network stack protocol layers may exist above the network layer 830, such as the transport layer 840, and others. Some embodiments of pseudo-point-to-point networking are not affected by or dependent upon such higher-level network protocols. Such pseudo-point-to-point networking implementations may provide abstracted data link layer functionality to the layers resting above the data link layer.

CONCLUSION

One or more of the systems 101, 102 may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Each of the services 115, 125, 316, 326 shown may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories 113, 123, 314, 324 may include persistent data storage devices (hard drives, solid state memory, etc.) that store the disclosed data, and may include associated code for managing such data.

Although the inventions have been described in terms of certain preferred embodiments, other embodiments will be apparent to those of ordinary skilled in the art, including embodiments that do not include all of the features and benefits set forth herein. Accordingly, the inventions are defined only by the appended claims. Any manner of software designs, architectures or programming languages can be used in order to implement embodiments of the invention. Components of the invention may be implemented in distributed, cloud-based, and/or web-based manners. Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for enabling network devices to communicate in an unnumbered network, the system comprising:
  a first network device comprising a first wired network interface and one or more other network interfaces, wherein the first wired network interface is associated with a first network layer address within a first subnet;
  a second network device comprising a second wired network interface and one or more other network interfaces, wherein the second wired network interface is associated with a second network layer address within a second subnet that is different than the first subnet; and
  a direct, physical wired network connection communicatively coupling only the first network device to the second network device via the first wired network interface and the second wired network interface;
  wherein (1) the first wired network interface lacks a network layer address unique within the first network device, (2) the second wired network interface lacks a network layer address unique within the second network device, (3) the first wired network interface and the second wired network interface are each configured to use a multiple access protocol, capable of communicating with multiple devices, as a single access protocol, (4) the second network device is configured to transmit an address request to the first network device in response to a service running on the second network device that has requested a network layer payload be transmitted to the first network device, wherein the address request does not include a hardware address associated with the second wired network interface, (5) the first network device is configured to transmit an address transmission over the first wired network interface using the direct, physical wired network connection in response to receiving the address request, the address transmission comprising a hardware address associated with the first wired network interface, so that the address transmission is directly received by only the second network device at the second wired network interface, wherein the address transmission does not comprise a network layer address and does not conform to any protocol for resolution of network layer addresses into link layer addresses, (6) the second network device is configured to store, in response to receiving the address transmission, the hardware address associated with the wired network interface which transmitted the address transmission, the hardware address stored in a memory location in the second network device that is configured to be accessed for addressing frames sent by the second wired network interface, and (7) the second network device is configured to, upon receipt of the network layer payload to transmit to the first wired network interface and the address transmission, extract, from the memory location, the stored hardware address resulting from the address transmission that does not conform to any protocol for resolution of network layer addresses into link layer addresses, construct a frame addressed to the hardware address comprising the network layer payload and the hardware address associated with the second wired network interface, and transmit the frame over the second wired network interface, the frame not conforming to a point-to-point network data link protocol, thereby enabling frame communication within the unnumbered network with fewer allocated network layer addresses than would be necessary if the network were configured in a numbered manner.

2. The system of claim 1, wherein the first network interface is an Ethernet interface, the network interfaces are Ethernet interfaces, the direct physical wired network connection comprises an Ethernet connection, and the frame is an Ethernet frame.

3. The system of claim 1, wherein the first network device and the second network device communicate, via the first wired network interface and the second wired network interface, using a multi-layer network protocol stack comprising a Media Access Control sub-layer and an Ethernet framing Logical Link Control sub-layer, the Media Access Control sub-layer located logically directly above a physical layer, and the Ethernet framing Logical Link Control sub-layer located logically directly below a network layer.

4. The system of claim 1, wherein the first network device and the second network device communicate, via the first wired network interface and the second wired network interface, using a multi-layer network protocol stack comprising only one data link layer protocol.

5. The system of claim 1, wherein the address transmission conforms to the Link Layer Discovery Protocol (LLDP).

6. The system of claim 1, wherein the hardware address is a Media Access Control (MAC) address.

7. A method for enabling network devices to communicate in an unnumbered network, the method comprising:
- transmitting, over a direct physical wired network connection, at a first wired network interface of a first device, an address request to a second wired network interface in response to a service running on the first device that has requested a network layer payload be transmitted to the second wired network interface, wherein the address request does not include a hardware address associated with the first wired network interface;
- receiving, over a direct physical wired network connection, at the first wired network interface in response to transmitting the address request, an address transmission comprising a hardware address corresponding to the second wired network interface, the first wired network interface capable of communicating with only one other network device at the link layer, the second wired network interface communicatively coupled with the first wired network interface using the direct physical wired network connection, the address transmission not including a network layer address and not conforming to any protocol for resolution of network layer addresses into link layer addresses, the address transmission not conforming to a point-to-point networking protocol, the first wired network interface associated with a first network layer address within a first subnet, and the second wired network interface associated with a second network layer address within a second subnet that is different than the first subnet;
- storing address data representative of an association between the hardware address and the first wired network interface and the second wired network interface in a memory location, the memory location configured to be accessed for addressing frames sent by the first wired network interface;
- upon receipt of the network layer payload to transmit to the second wired network interface and the address transmission, accessing the address data in the memory location configured to be accessed for addressing frames sent by the first wired network interface to obtain the hardware address;
- constructing a frame comprising, as a destination address, the hardware address corresponding to the second wired network interface resulting from the address transmission that does not conform to any protocol for resolution of network layer addresses into link layer addresses, and, as a source address, the hardware address associated with the first wired network interface; and
- transmitting the frame via the first wired network interface so that the frame is directly received at only the second wired network interface, the frame comprising the hardware address corresponding to the second wired network interface as a destination address and conforming to a multiple access protocol, capable of communicating with multiple devices;
- the method performed by a computer system that comprises computer hardware.

8. The method of claim 7, wherein the network interfaces communicate using an Ethernet protocol.

9. The method of claim 7, wherein the address transmission conforms to the Link Layer Discovery Protocol (LLDP).

10. The method of claim 7, wherein the hardware address corresponding to the second wired network interface is a Media Access Control (MAC) address.

11. A system for enabling network devices to communicate in an unnumbered network, the system comprising:
- an unnumbered first wired network interface, not uniquely associated with a network layer address within a network device in which the first wired network interface is operative, the first wired network interface associated with a first hardware address, the first wired network interface capable of operating in a non-point-to-point manner, the first wired network interface associated with a first network layer address within a first subnet;
- a second network interface;
- an interface data store configured to maintain interface data indicative of one or more configuration settings for the first wired network interface, the one or more configuration settings comprising a setting indicating whether or not the first wired network interface is operating in a pseudo-point-to-point manner; and
- an address service configured to access at least some of the interface data in order to determine whether the first wired network interface is configured to operate in a pseudo-point-to-point manner;
- wherein the address service is further configured to transmit an address transmission over a direct physical wired network connection, from the first wired network interface to only one other computing device, in response to the interface data indicating that the first network interface is configured to operate in a pseudo-point-to-point manner and in response to receipt of an address request from the one other computing device, wherein the address request is received from the one other computing device in response to a service running on the one other computing device requesting a payload be transmitted to the first network interface, wherein the address request does not include a hardware address associated with the one other computing device, the address transmission comprising the first hardware address, wherein the first wired network interface is configured to receive a frame over the direct physical wired network connection, from the one other computing device, comprising the first hardware address as a destination address, the hardware address associated with the one other computing device as a source address, and the payload, and process the frame such that data associated with the payload of the frame may be transmitted by the second network interface, and wherein a network interface of the one other computing device is associated with a second network layer address within a second subnet that is different than the first subnet,
- wherein the address transmission does not comprise a network layer address and does not conform to any protocol for resolution of network layer addresses into link layer addresses.

12. The system of claim 11, wherein the frame is an Ethernet frame.

13. The system of claim 11, wherein the frame payload is an Internet Protocol (IP) packet.

14. The system of claim 11, wherein the address transmission conforms to the Link Layer Discovery Protocol (LLDP).

15. The system of claim 11, wherein the hardware address is a Media Access Control (MAC) address.

* * * * *